J. KNOWLSON.
GOVERNORS FOR STEAM ENGINES.
No. 177,404.        Patented May 16, 1876.
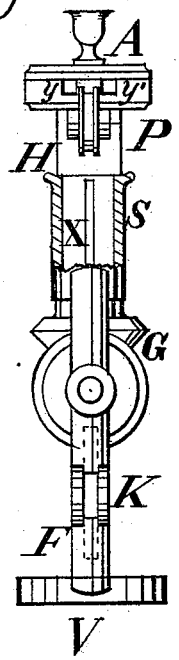
Fig. 2
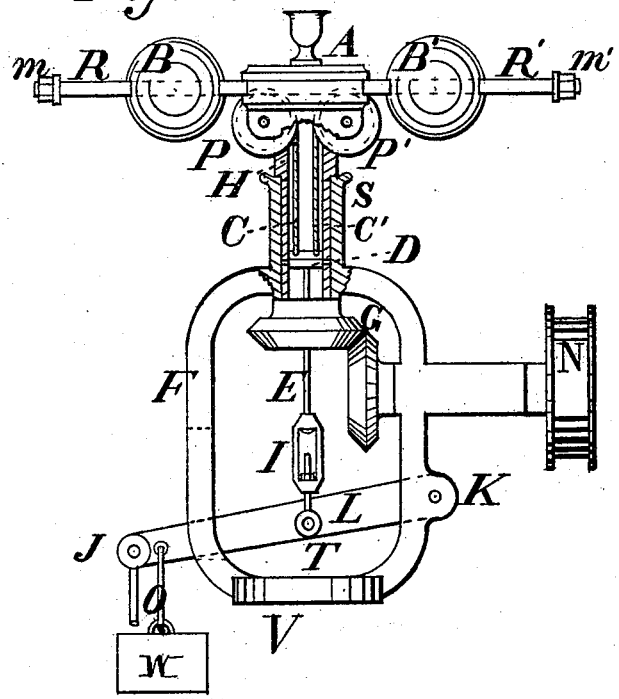
Fig. 1
Fig. 6.    Fig. 5.    Fig. 3.
    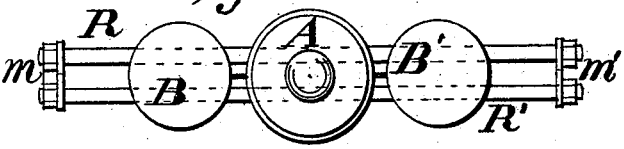
Fig. 7.    Fig. 8.    Fig. 4.
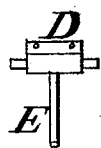    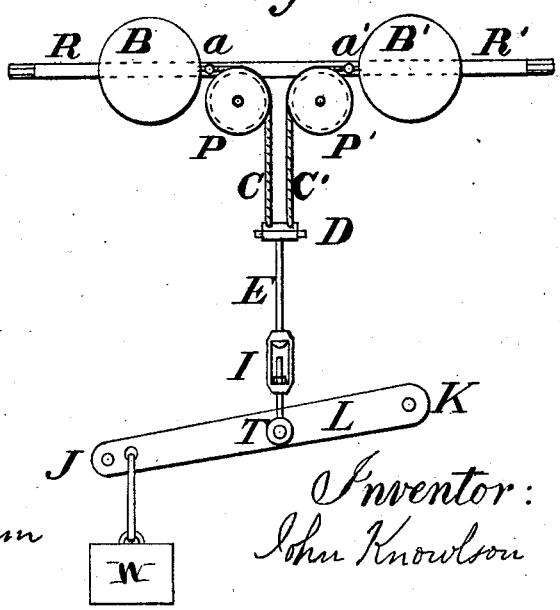
Witnesses;
Andrew Cunningham
James W. Palmer
Inventor:
John Knowlson

UNITED STATES PATENT OFFICE.

JOHN KNOWLSON, OF TROY, NEW YORK.

IMPROVEMENT IN GOVERNORS FOR STEAM-ENGINES.

Specification forming part of Letters Patent No. 177,404, dated May 16, 1876; application filed January 27, 1876.

*To all whom it may concern:*

Be it known that I, JOHN KNOWLSON, of the city of Troy, in the county of Rensselaer and State of New York, have invented a new and Improved Governor for Steam-Engines, the nature and object of which will more fully appear in the annexed specification and drawing, to which reference is had, like letters referring to corresponding parts.

My invention consists of an upright hollow shaft having vertical grooves therein to guide the cross-bar connection, hereinafter mentioned. It consists, also, of one or more bars, held at right angles to the hollow shaft, upon which bar or bars the balls slide back and forth, for the purposes herein set forth. It further consists in the attachment of a chain or cord to each of said governing-balls, which chain or cord runs over separate pulleys in the cross-head of the hollow shaft, and thence downward to link with the cross-sliding-bar connection. It also consists of said cross-bar connection having pins or arms through the same, to slide up and down within the grooves in the hollow shaft, which, in rotating, prevent the chains or cords from twisting in operation.

Figure 1 is a general view of my device in elevation, with part of sleeve and hollow shaft broken away, so as to show position of cross-slide D.

Fig. 2 is an end elevation, with part of sleeve broken away to show slot X in the hollow shaft H, Fig. 1.

Fig. 3 is a plan of the top part of Fig. 1, showing the position of balls B B', and parallel rods R R' passing through the top A of the hollow shaft.

Fig. 4 is an elevation, showing the operating parts inside of the hollow shaft—viz., cross-slide D, chain C C', running over the pulleys P P', and sliding-bar stem E, connected with the lever L at T.

Fig. 5 is a face view of the pulley P. Fig. 6 is a view of the groove of the same. Fig. 7 is a side view of the sliding bar D and stem. Fig. 8 is an end view of the same.

In construction the upright hollow shaft H is cast with the head-piece of the governor-support. A cap-piece, A, is firmly screwed to the same to hold the rods or bars (inserted in suitable openings) in position. The governing-balls B B' are cast with holes to receive the horizontal rods R R', and between the horizontal bars on the balls are screwed eyebolts, to which are attached the chains C C', as seen in Fig. 4. The chains pass over the revolving pulleys P, and are connected with the cross-slide D. In the slide-bar I insert the arms or pins, (seen in Fig. 7,) which work up and down closely in the vertical grooves. These grooves may be in an open-work frame-support, instead of a hollow shaft, and the operation remain the same. The sliding bar has attached a headed stem, E, which revolves within the turn-buckle or sleeve I, which may be connected with the stem of the throttle-valve, and operate as usual; or the cross-slide stem E, with or without a turn-buckle attachment, may be joined with the lever L, having a fixed fulcrum, K, and valve-stem O jointed therewith, to operate a throttle-valve, as seen in Fig. 1, or a cut-off engine, as desired. The frame F, cog-wheels G, sleeve S, and driving-pulley N are made and operated in the usual manner.

My device is put in operation by a belt or suitable gearing, and the operating parts within the hollow shaft (seen in Figs. 1 and 4) being rotated rapidly by the centrifugal force, the balls fly outwardly to the verge of the rods to nuts $m$ $m'$, and the chain-connections raise the sliding bar D and valve-stem attachments communicating with the throttle-valve or cut-off valves, and operate the class of engines employed. Then, by means of a weight, W, or spring attached to the end of the lever L at joint J, Figs. 1 and 4, by suitable connections, the balls will be drawn back on the bars to the first position, or they will slide back and forth, according to the varying speed of the engine, and regulate and cut off the steam in its admission to the steam-cylinder.

In comparison with the common governor my device shows simplicity in operation, durability for continued work, and efficiency in action under all circumstances. Its greatest efficiency, however, is found to be in operating, handling, and controlling the slide and cut-off valves in cut-off engines, dispensing with a throttle-valve.

I claim—

The combination, in a governing device, of a vertical and revolving hollow shaft, H, having at or near its top a bar or bars, upon which slide the weights B B', the pulleys P P', over which passes a cord or chain, C C', attached at one end to the weights B B', and at the other to the block D, which slides in vertical grooves in the shaft H, the rod E, buckle I, adapted to hold in suspension a valve-rod, all for the purpose set forth and described.

JOHN KNOWLSON.

Witnesses:
ANDREW CUNNINGHAM,
GOTTFRIED ZIMMERMANN.